United States Patent
Xu et al.

(10) Patent No.: US 9,326,231 B2
(45) Date of Patent: Apr. 26, 2016

(54) METHOD AND APPARATUS FOR SELECTING CELL IN WIRELESS COMMUNICATION SYSTEM

(71) Applicant: LG ELECTRONICS INC., Seoul (KR)

(72) Inventors: Jian Xu, Anyang-si (KR); Gene Beck Hahn, Anyang-si (KR); Kyung Min Park, Anyang-si (KR); Jin Sook Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 14/343,732

(22) PCT Filed: Sep. 26, 2012

(86) PCT No.: PCT/KR2012/007733
§ 371 (c)(1),
(2) Date: Mar. 7, 2014

(87) PCT Pub. No.: WO2013/048096
PCT Pub. Date: Apr. 4, 2013

(65) Prior Publication Data
US 2014/0226605 A1    Aug. 14, 2014

Related U.S. Application Data

(60) Provisional application No. 61/538,972, filed on Sep. 26, 2011, provisional application No. 61/539,947, filed on Sep. 27, 2011, provisional application No. 61/541,106, filed on Sep. 30, 2011, provisional application No. 61/542,130, filed on Sep. 30, 2011.

(51) Int. Cl.
*H04W 4/00* (2009.01)
*H04W 48/20* (2009.01)
(Continued)

(52) U.S. Cl.
CPC ............... *H04W 48/20* (2013.01); *H04L 12/14* (2013.01); *H04W 24/02* (2013.01); *H04W 84/045* (2013.01); *H04W 92/20* (2013.01)

(58) Field of Classification Search
CPC ............................... H04W 48/20; H04L 12/14
USPC ............. 370/331; 455/436–446, 550.1–575.9
See application file for complete search history.

(56) References Cited

U.S. PATENT DOCUMENTS

2005/0176440 A1 *   8/2005   Sang et al. ............. 455/453
2010/0254274 A1    10/2010   Westerberg et al.
(Continued)

OTHER PUBLICATIONS

ETSI TR 136 902 V9.3.1 (May 2011), LTE; Evolved Universal Terrestrial Radio Access Network (E-UTRAN); Self-configuring and self-optimizing network (SON) use cases and solutions (3GPP TR 36.902 version 9.3.1 Release 9), 23 pages.
(Continued)

*Primary Examiner* — Mang Yeung
(74) *Attorney, Agent, or Firm* — Birch, Stewart, Kolasch & Birch, LLP

(57) ABSTRACT

A method and apparatus for selecting a cell in a wireless communication system is provided. A pico eNodeB (eNB) or a home eNB (HeNB) receives served cell information for a primary cell (PCell) or a secondary cell (SCell) from an interfering neighbor eNB. The served cell information includes information on the number or portion of user equipments (UEs) served by a corresponding cell and information on a resource usage status of the corresponding cell by the UEs. The pico eNB or the HeNB selects a PCell or a SCell based on the received served cell information.

12 Claims, 15 Drawing Sheets

(51) Int. Cl.
*H04W 24/02* (2009.01)
*H04L 12/14* (2006.01)
*H04W 92/20* (2009.01)
*H04W 84/04* (2009.01)

(56) References Cited

U.S. PATENT DOCUMENTS

2011/0237258 A1* 9/2011 Nylander et al. ............ 455/437

2012/0021791 A1* 1/2012 Sung et al. .................... 455/509

OTHER PUBLICATIONS

ETSI TS 136 304 V9.1.0 (Feb. 2010), LTE; Evolved Universal Terrestrial Radio Access (E-UTRA); User Equipment (UE) procedures in idle mode (3GPP TS 36.304 version 9.1.0 Release 9), 33 pages.

* cited by examiner

Fig. 3
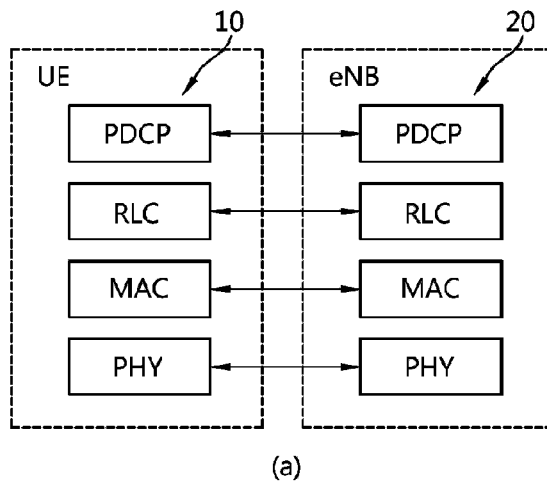
(a)
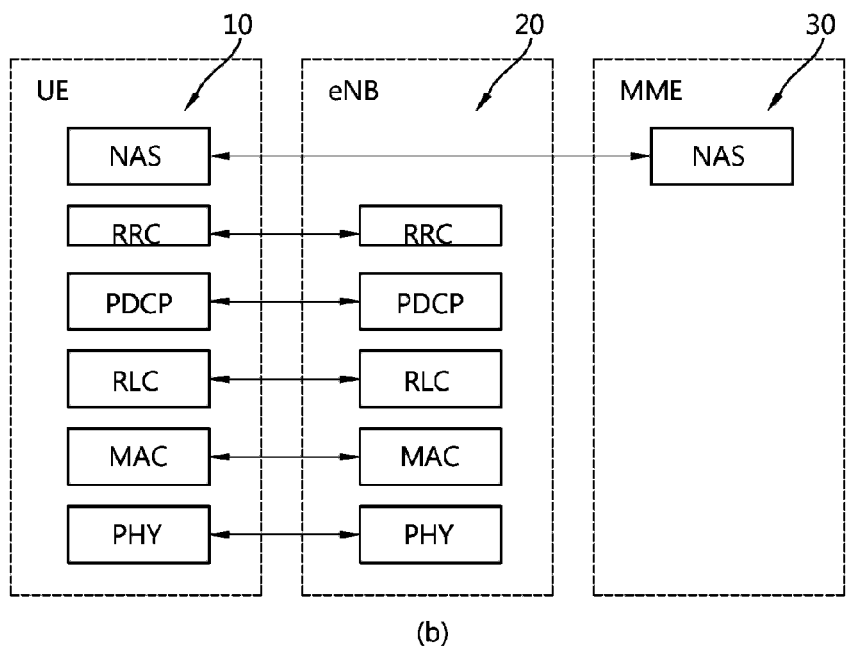
(b)
Fig. 4
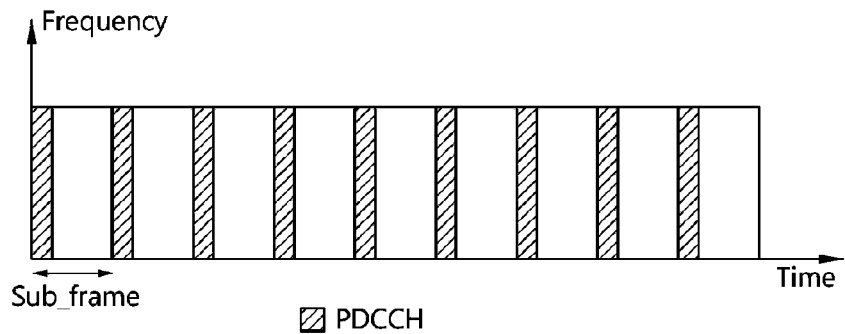

METHOD AND APPARATUS FOR SELECTING CELL IN WIRELESS COMMUNICATION SYSTEM

CROSS REFERENCE TO RELATED APPLICATIONS

This application is the National Phase of PCT/KR2012/007733 filed on Sep. 26, 2012, which claims priority under 35 U.S.C. 119(e) to U.S. Provisional Application Nos. 61/538,972, 61/539,947, 61/541,106 and 61/542,130 filed on Sep. 26, 2011, Sep. 27, 2011, Sep. 30, 2011 and Sep. 30, 2011 respectively, all of which are hereby expressly incorporated by reference into the present application.

TECHNICAL FIELD

The present invention relates to wireless communication, and more particularly, to a method and apparatus for selecting a cell in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighbor eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARM). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighbor cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. It may be referred to Paragraph 4.6.1 of 3GPP (3rd generation partnership project) TS 36.300 V10.2.0 (2010-12). The HeNB is a small base station designed for use in residential or small business environment. The HeNB may be a femto cell. The HeNB is short range about tens of meter, installed by the consumer for better indoor voice and data reception.

FIG. 5 shows logical architecture of an E-UTRAN HeNB.

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

Inter-cell interference coordination (ICIC) has the task to manage radio resources such that inter-cell interference is kept under control. The ICIC mechanism includes a frequency domain component and time domain component. The preferred ICIC method may be different in the uplink and downlink.

Meanwhile, the 3GPP LTE rel-8 (hereinafter, rel-8) and the 3GPP LTE rel-10 (hereinafter, rel-10) ICIC mechanisms have been defined for intra-carrier cases. The rel-8 ICIC mechanism is designed for macro cell-only scenario. The Rel-10 ICIC mechanism is designed for scenarios of a macro cell and a femto cell as well as a macro cell and a pico cell. Now for 3GPP LTE rel-11, the method of autonomous interference management in a heterogeneous network (HetNet) with the mixture of different cell types and without tight synchronization requirements is regarded as a next step of further development for the optimal use of available frequency assets.

It is expected that the HetNet deployments in 3GPP LTE rel-11 basically assume that multiple carriers are used and carrier aggregation is supported. On the other hand, 3GPP LTE rel-10 uses single carrier. Therefore, when the ICIC mechanism is applied to the HetNet deployments in 3GPP LTE rel-11, there might be a few of considerations.

SUMMARY OF INVENTION

Technical Problem

The present invention provides a method and apparatus for selecting a cell in a wireless communication system. The present invention provides a method for a pico eNB or a home eNodeB (HeNB) selecting a cell in a heterogeneous network (HetNet).

Solution to Problem

In an aspect, a method for selecting, by a pico eNodeB (eNB), a cell in a wireless communication system is provided. The method includes receiving a served cell information for a primary cell (PCell) or a secondary cell (SCell) from a neighbor eNB, the served cell information being configured by the neighbor eNB, the served cell information including information on the number or portion of user equipments (UEs) served by a corresponding cell and information on a resource usage status of the corresponding cell by the UEs, and selecting a PCell or a SCell based on the received served cell information.

In another aspect, a method for selecting a cell in a wireless communication system is provided. The method includes receiving an eNodeB (eNB) configuration update message including a served cell information for a primary cell (PCell) or a secondary cell (SCell) from a pico eNB, the served cell information being configured by the neighbor eNB, the served cell information including information on the number or portion of user equipments (UEs) served by a corresponding cell and information on a resource usage status of the corresponding cell by the UEs, and selecting a primary cell (PCell) or a secondary cell (SCell) based on the received served cell information.

In another aspect, a method for selecting, by a home eNodeB (HeNB), a cell in a wireless communication system is provided. The method includes transmitting a carrier information request message including a request of information on carriers used by a neighbor eNB, receiving a carrier information response message as a response of the carrier information request message, the carrier information response message including a served cell information for a primary cell (PCell) or a secondary cell (SCell) from a pico eNB, the served cell information being configured by the neighbor eNB, the served cell information including information on the number or portion of user equipments (UEs) served by a corresponding cell and information on a resource usage status of the corresponding cell by the UEs, and selecting a PCell or a SCell based on the received served cell information.

Advantageous Effects of Invention

Automatic self carrier selecting mechanism without the need for prior network planning can be provided.

BRIEF DESCRIPTION OF DRAWINGS

FIG. 3 shows a user-plane protocol and a control-plane protocol stack for the E-UMTS.

FIG. 4 shows an example of structure of a physical channel.

MODE FOR THE INVENTION

Figure 1:
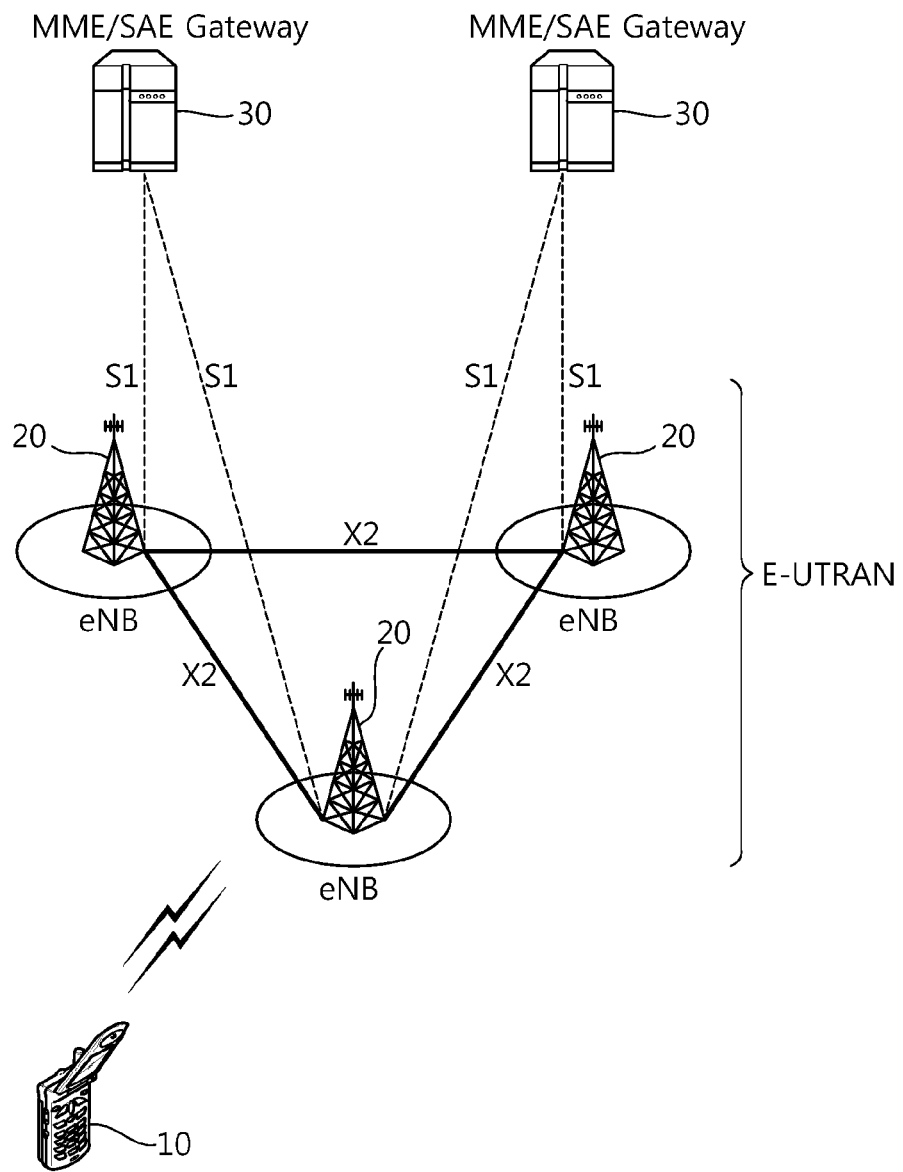
FIG. 1 shows network structure of an evolved universal mobile telecommunication system (E-UMTS). The E-UMTS may be also referred to as an LTE system.
Figure 2:
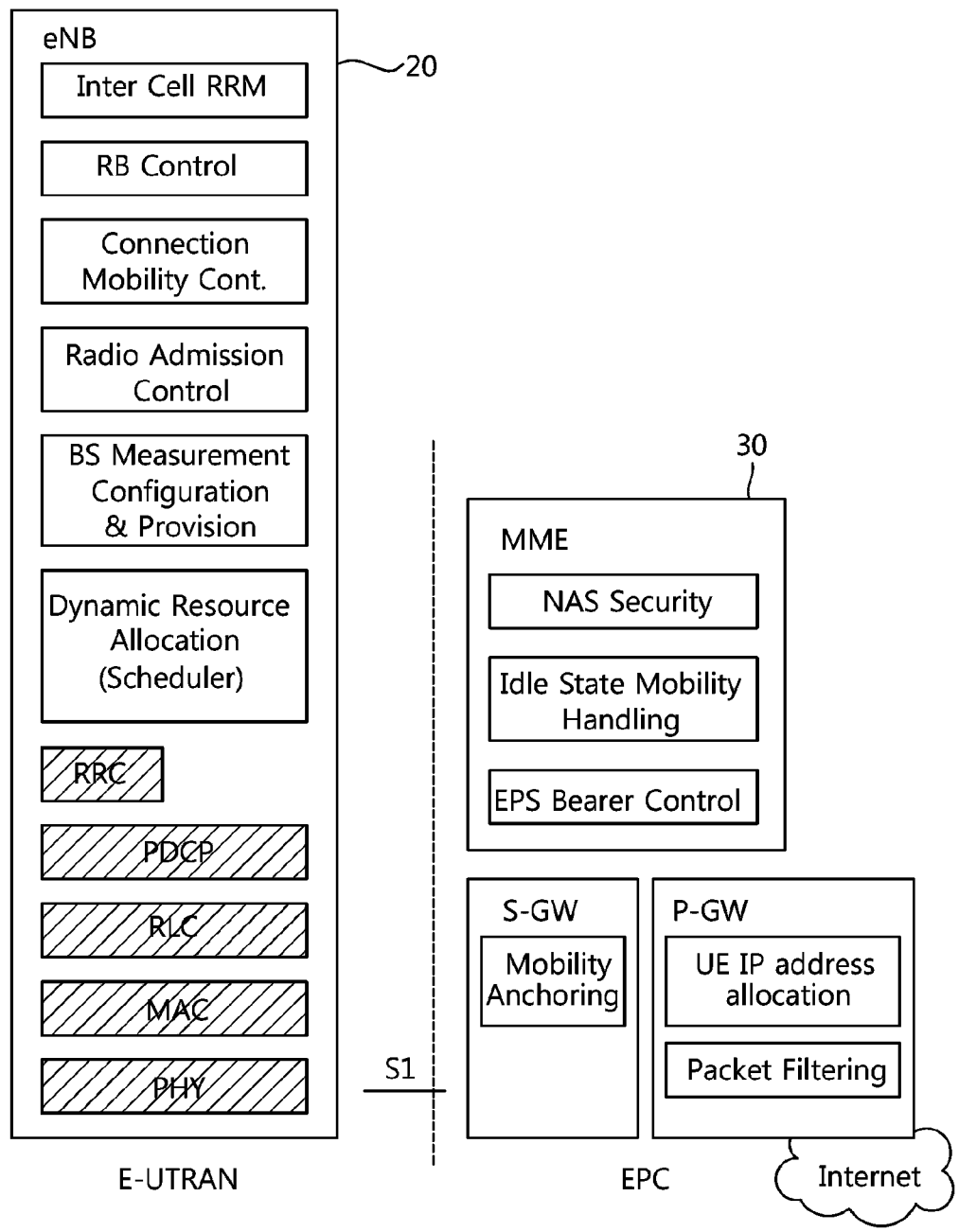
FIG. 2 shows architecture of a typical E-UTRAN and a typical EPC.
Figure 5:
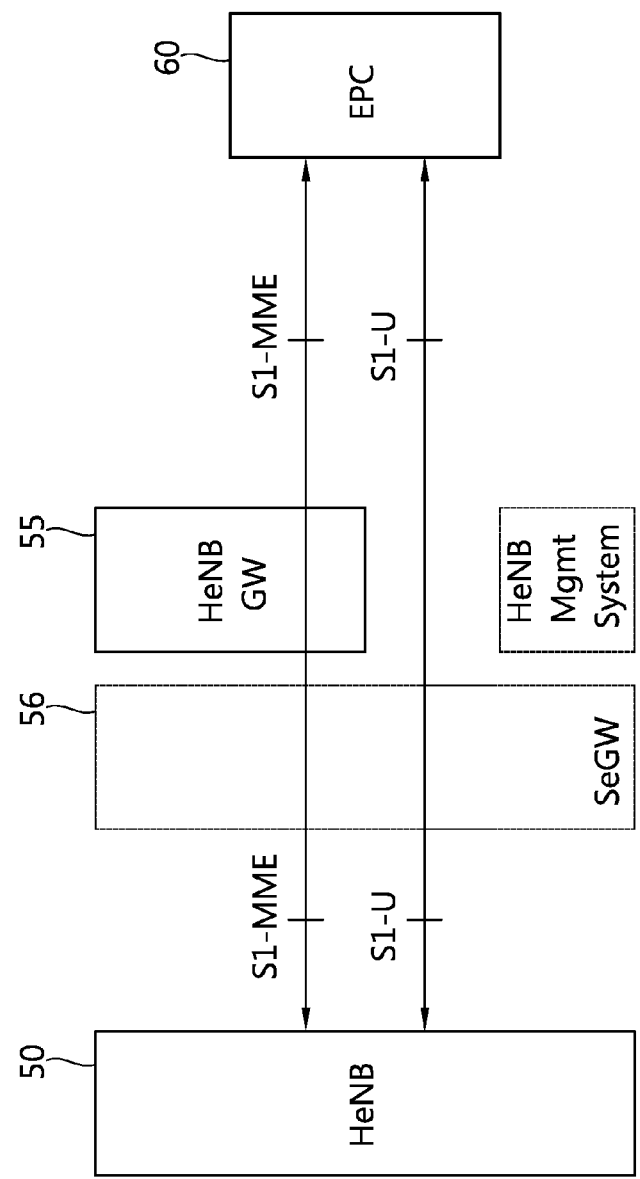
FIG. 5 shows logical architecture of an E-UTRAN HeNB.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

To meet the targets set by 3GPP LTE-A, e.g., bandwidth up to 100 MHz, peak data rates up to 1 Gbps in DL and peak data rates up to 500 Mbps in UL, carrier aggregation (CA) concept is introduced. In the CA, two or more component carriers (CCs) are aggregated in order to support wider transmission bandwidths up to 100 MHz. A UE may simultaneously receive or transmit on one or multiple CCs depending on its capabilities. That is, a rel-10 UE with reception and/or transmission capabilities for the CA can simultaneously receive and/or transmit on multiple CCs corresponding to multiple serving cells. A rel-8/9 UE can receive on a single CC and transmit on a single CC corresponding to one serving cell only. The CA is supported for both contiguous and non-contiguous CCs. It is possible to configure a UE to aggregate a different number of CCs originating from the same eNB and of possibly different bandwidths in the UL and the DL. That is, the number of DL CCs that can be configured depends on the DL aggregation capability of the UE. The number of UL CCs that can be configured depends on the UL aggregation capability of the UE.

When the CA concept is applied to the scenarios of pico eNB or home eNodeB (HeNB) deployment, the pico eNB or the HeNB can operate via a set of allowed carriers configured by operators. The basic principle is that primary cell (PCell)/secondary cell (SCell) should be set in a UE-specific manner. For example, it is assumed that there are two carriers, e.g., carrier A and carrier B. It is also assumed that there are two UEs, e.g., UE C and UE D. For the UE C, the carrier A can be assigned as a PCell and the carrier B can be assigned as a SCell. For the UE D, the carrier B can be assigned as a PCell and the carrier A can be assigned as a SCell. This is an example of CA configuration per UE basis.

In the case the pico eNB is interfered by neighbor macro eNB (or pico eNB, HeNB), the pico eNB shall continue operation by selecting another carrier from the available carriers allowed to be used. Obviously, the newly selected carrier by the pico eNB should be the one that is less interfered by the neighbor macro eNB (or pico eNB, HeNB). Therefore, some enhancements are needed for the method of carrier selection by the pico eNB in a heterogeneous network (HetNet) environment. A method of automatic PCell/SCell(s) selection for carrier resolution which can reduce the interference between the pico eNB and the neighbor macro eNB (or pico eNB, HeNB) may be proposed.

In case that the HeNB is switched on, it shall start by selecting one carrier from the available carriers, which is mandatory for the PCell and is optional for the SCell(s). Due to the lack of synchronization requirements between the macro eNB and the newly deployed HeNB, the interference related problems can happen between the macro eNB the newly deployed HeNB. Also, in case that the macro eNB and the newly deployed HeNB are already working, due to the lack of synchronization requirements between the macro eNB and the newly deployed HeNB, the interference related problems can happen between the macro eNB and the newly deployed HeNB which are already working. Thus, some enhancements are needed for the method of carrier selection by the HeNB in the HetNet environment. A method of automatic PCell/SCell(s) selection for carrier resolution which can reduce the interference between the macro eNB and the HeNB may be proposed.

There are several ways to resolve the problems mentioned above. Hereinafter, various examples of the proposed method for selecting a carrier by the pico eNB or the HeNB in the HetNet environment according to the present invention are described. At first, a method of automatic PCell/SCell(s) selection for carrier resolution between the pico eNB and the neighbor macro eNB (or pico eNB, HeNB) will be described.

Basically, it is assumed that the macro eNB (or pico eNB, HeNB) may know the interference status of the neighbor pico eNB if the X2 interface is already setup between them. This is because the pico eNB may generate an X2 load information message to inform the macro eNB (or pico eNB, HeNB) of the experienced high UL interference. This can be an indication that the pico eNB is a victim of interference generated from the macro eNB (or pico eNB, HeNB). Accordingly, the eNB (macro eNB, pico eNB or HeNB) may keep managing information about which cell(s) is/are configured for UEs as PCell or SCell(s). By storing such information, each eNB can trace the number of UEs served by specific cell (either as PCell or SCell). That is, for some UEs, a cell may serve as PCell and for other UEs, the cell may simultaneously serve as SCell. Besides, each eNB can trace how many radio resources are used within the corresponding PCell or SCell(s) in terms of the usage of UL PRB (physical resource block), DL PRB, and total PRB.

Figure 6:
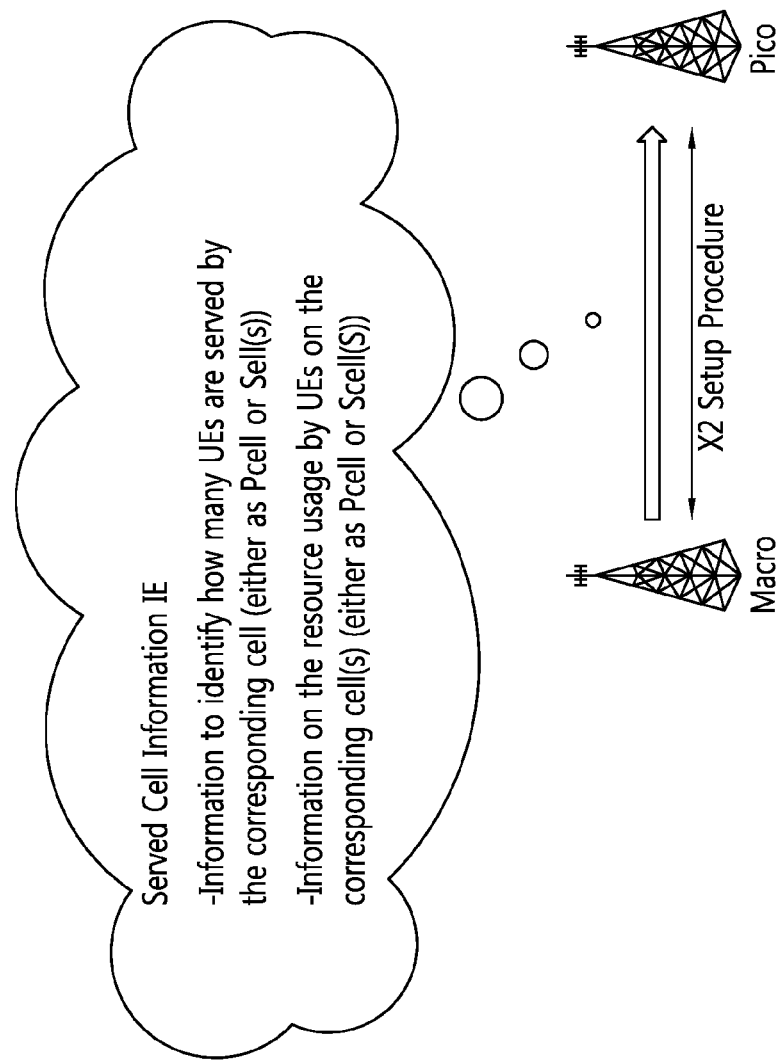
FIG. 6 shows an example of proposed method of selecting a cell in a HetNet according to an embodiment of the present invention.

FIG. 6 shows an example of proposed method of selecting a cell in a HetNet according to an embodiment of the present invention.

Referring to FIG. 6, the newly pico eNB obtains the information required for PCell/SCell(s) selection via the X2 setup procedure between the pico eNB and the neighbor macro eNB. Here, the HeNB is ready to first select the PCell or Scell(s).

The macro eNB transmits an X2 setup request/response message including served cell information IE for the PCell/SCell(s) to the pico eNB. The served cell information IE may be configured by the macro eNB. The served cell information IE may include information to identify how many UEs are served by the corresponding cell (either as PCell or SCell(s)). The served cell information IE may include information on the resource usage by UEs on the corresponding cell (either as PCell or SCell(s)). The served cell information IE may include following information:

UE ratio indication IE: the number of UEs using this cell as a PCell
PCell indication information
High density, medium density, low density
UE ratio indication IE: the number of UEs using this cell as a SCell(s)
SCell(s) indication information
High density, medium density, low density
Resource usage status IE: resource usage status of corresponding cell by UEs: The resource usage status may be calculated for the DL/UL/total PRB as defined in X2 interface.
PCell indication information or SCell(s) indication information
High use, medium use, low use
Or, radio resource status IE defined in the 3GPP TS 36.423 may also be added in the served cell information IE.

When the pico eNB receives the X2 setup request message or the X2 setup response message, the pico eNB can flexibly select the PCell/SCell(s) based on the received information to mitigate interference between the pico eNB and the macro eNB. As an example, the pico eNB may simply select the PCell or SCell(s) that is not affected from interference from the cell(s) of the neighbor macro eNB. This may be inferred from other information that is exchanged via the X2 setup procedure, i.e., frequency and bandwidth. Also, there may be a few possible cases to use the combination of information explained above. For example, if the UE ratio indication IE indicates high density for the macro eNB (indicated as PCell), the pico eNB may avoid configuring its cell using the same carrier frequency with that of the macro eNB (indicated as PCell) as its PCell. Although the UE ratio indication IE indicates medium density or even low density, if the resource usage status IE (or the radio resource status IE) indicates high density, then the pico eNB may avoid configuring its cell using the same carrier frequency with that of the macro eNB (indicated as PCell) as its PCell. The same principle may be applied to the selection of SCell(s) by the pico eNB.

In this way, the pico eNB deployment will benefit from having the support of flexible PCell/SCell(s) selection method. The enhanced X2 setup procedure described above may be equally applied to the X2 setup between the already deployed pico eNB and the newly deployed pico eNB. Similarly, it can also be applied to the X2 setup between the already deployed pico eNB and the newly deployed HeNB with (or without) the aid of the HeNB GW.

Figure 7:
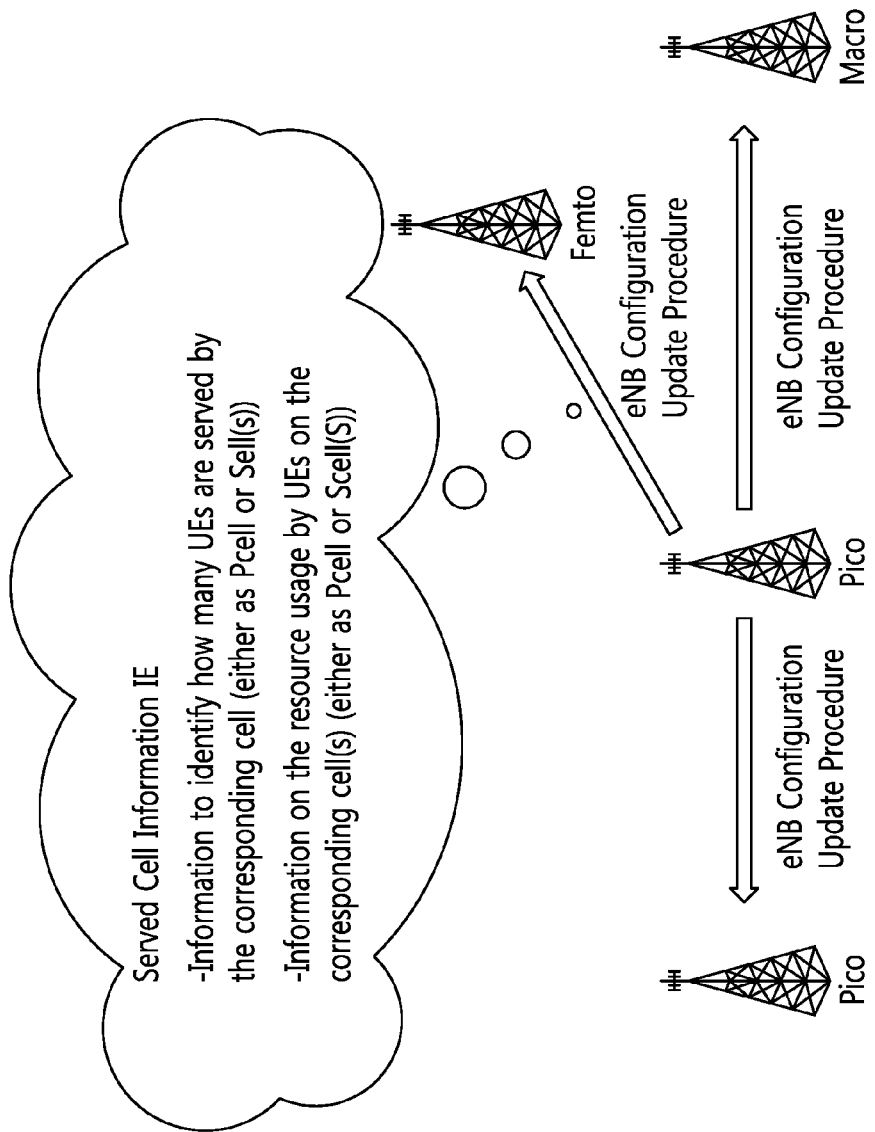
FIG. 7 shows another example of proposed method of selecting a cell in a HetNet according to an embodiment of the present invention.

FIG. 7 shows another example of proposed method of selecting a cell in a HetNet according to an embodiment of the present invention. This method can be performed after the pico eNB completes configuring its PCell or SCell(s). The pico eNB may send the results of its own PCell/SCell(s) configuration to the other neighbour eNBs, e.g., macro eNB, pico eNB or HeNB.

Referring to FIG. 7, the pico eNB transmits an update of its configuration change regarding the information on PCell/SCell(s) selection via the configuration update procedure to the neighbor macro eNB, pico eNB or HeNB. The neighbor eNB receiving the update of the pico eNB's configuration change may use such information for its PCell/SCell(s) selection.

The pico eNB transmits an eNB configuration update message including served cell information IE for the PCell/SCell(s) to the neighbor eNBs. The served cell information IE may be configured by the macro eNB. The served cell information IE may include information to identify how many UEs are served by the corresponding cell (either as PCell or SCell(s)). The served cell information IE may include information on the resource usage by UEs on the corresponding cell (either as PCell or SCell(s)). The served cell information IE may include following information:

UE ratio indication IE: the number of UEs using this cell as a PCell
PCell indication information
High density, medium density, low density
UE ratio indication IE: the number of UEs using this cell as a SCell
SCell indication information
High density, medium density, low density
Resource usage status IE: resource usage status of corresponding cell by UEs: The resource usage status may be calculated for the DL/UL/total PRB as defined in X2 interface.
PCell indication information or SCell indication information
High use, medium use, low use
Or, radio resource status IE defined in the 3GPP TS 36.423 may also be added in the served cell information IE.

When the neighbor eNB receives the eNB configuration update message, the neighbor eNB can flexibly select the PCell/SCell(s) based on the received information to mitigate interference between itself and the pico eNB transmitting the eNB configuration update message. As an example, the neighbor eNB may simply select the PCell or SCell(s) that is not affected from interference from the cell(s) of the pico eNB. This may be inferred from other information that is exchanged via the X2 setup procedure, i.e., frequency and bandwidth. Also, there may be a few possible cases to use the combination of information explained above. For example, if the UE ratio indication IE indicates high density for the pico eNB (indicated as PCell), the neighbor eNB may avoid configuring its cell using the same carrier frequency with that of the pico eNB (indicated as PCell) as its PCell. Although the UE ratio indication IE indicates medium density or even low density, if the resource usage status IE (or the radio resource status IE) indicates high density, then the neighbor eNB may avoid configuring its cell using the same carrier frequency with that of the pico eNB (indicated as PCell) as its PCell. The same principle may be applied to the selection of SCell(s) by the pico eNB.

In this way, the neighbor eNBs will benefit from having the support of flexible PCell/SCell(s) selection method. If the neighbor eNB is the HeNB, the enhanced X2 setup procedure may be applied with (or without) the aid of HeNB GW.

Figure 8:
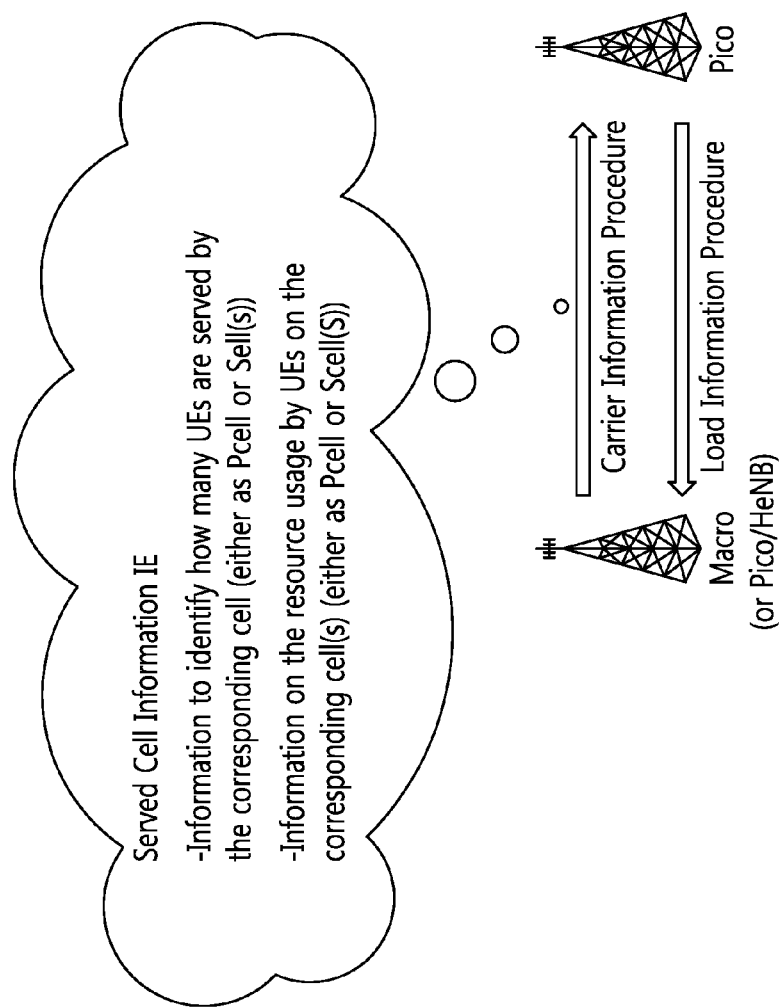
FIG. 8 shows another example of proposed method of selecting a cell in a HetNet according to an embodiment of the present invention.

FIG. 8 shows another example of proposed method of selecting a cell in a HetNet according to an embodiment of the present invention. This case is for the scenario where the pico eNB detects the interference from the neighbor macro eNB (or pico eNB, HeNB).

Referring to FIG. 8, the already deployed pico eNB obtains the information required for PCell or SCell(s) selection via the carrier information procedure between the pico eNB and the macro eNB. This procedure can be performed after the victim pico eNB transmits a load information message to the aggressor macro eNB. The interference may result from several reasons made on the macro eNB.

When the pico eNB detects that it is interfered from the neighbor macro eNB (or pico eNB, HeNB), the pico eNB transmits the load information message to the neighbor macro eNB (or pico eNB, HeNB). The interfered pico eNB uses the same frequency with the interfering macro eNB (or pico eNB, HeNB).

The neighbor macro eNB (or pico eNB, HeNB) transmits the carrier information message including served cell information IE for the PCell/SCell(s) to the pico eNB. The served cell information IE may be configured by the neighbor macro eNB (or pico eNB, HeNB). The served cell information IE may include information to identify how many UEs are served by the corresponding cell (either as PCell or SCell(s)). The served cell information IE may include information on the resource usage by UEs on the corresponding cell (either as PCell or SCell(s)). If the neighbor eNB is the HeNB, the carrier information procedure may be performed with (or without) the aid of the HeNB GW. The served cell information IE may include following information:

UE ratio indication IE: the number of UEs using this cell as a PCell
PCell indication information
High density, medium density, low density
UE ratio indication IE: the number of UEs using this cell as a SCell
SCell indication information
High density, medium density, low density
Resource usage status IE: resource usage status of corresponding cell by UEs: The resource usage status may be calculated for the DL/UL/total PRB as defined in X2 interface.
PCell indication information or SCell indication information
High use, medium use, low use Or, radio resource status IE defined in the 3GPP TS 36.423 may also be added in the served cell information IE.

When the pico eNB receives the carrier information message, the pico eNB can flexibly select the PCell/SCell(s) based on the received information to mitigate interference between the pico eNB and the neighbor eNBs. As an example, the pico eNB may simply select the PCell or SCell(s) that can avoid interference from the cell(s) of the neighbor eNBs. This may be inferred from other information contained in the served cell information IE, i.e., frequency and bandwidth. Also, there may be a few possible cases to use the combination of information explained above. For example, if the UE ratio indication IE indicates high density for the neighbor eNB (indicated as PCell), the pico eNB may avoid configuring its cell using the same carrier frequency with that of the neighbor eNB (indicated as PCell) as its PCell. Although the UE ratio indication IE indicates medium density or even low density, if the resource usage status IE (or the radio resource status IE) indicates high density, then the pico eNB may avoid configuring its cell using the same carrier frequency with that of the neighbor eNB (indicated as PCell) as its PCell. The same principle may be applied to the selection of SCell(s) by the pico eNB.

In this way, the interfered pico eNB will benefit from having the support of flexible PCell/SCell(s) selection method.

Hereinafter, a method of automatic PCell/SCell(s) selection for carrier resolution between the HeNB and the neighbor macro eNB will be described.

Basically, it is assumed that the newly deployed HeNB may measure a reference signal (e.g., reference signal received power levels) from a neighbor macro eNB when it is powered on. The eNBs (macro eNB, pico eNB or HeNB) may keep managing information about which cell(s) is/are configured for UEs as PCell or SCell(s). By storing such information, each eNB can trace the number of UEs served by specific cell (either as PCell or SCell). Also, each eNB can trace how many radio resources are used within the corresponding PCell or SCell(s) in terms of the usage of UL PRB, DL PRB, and total PRB.

Figure 9:
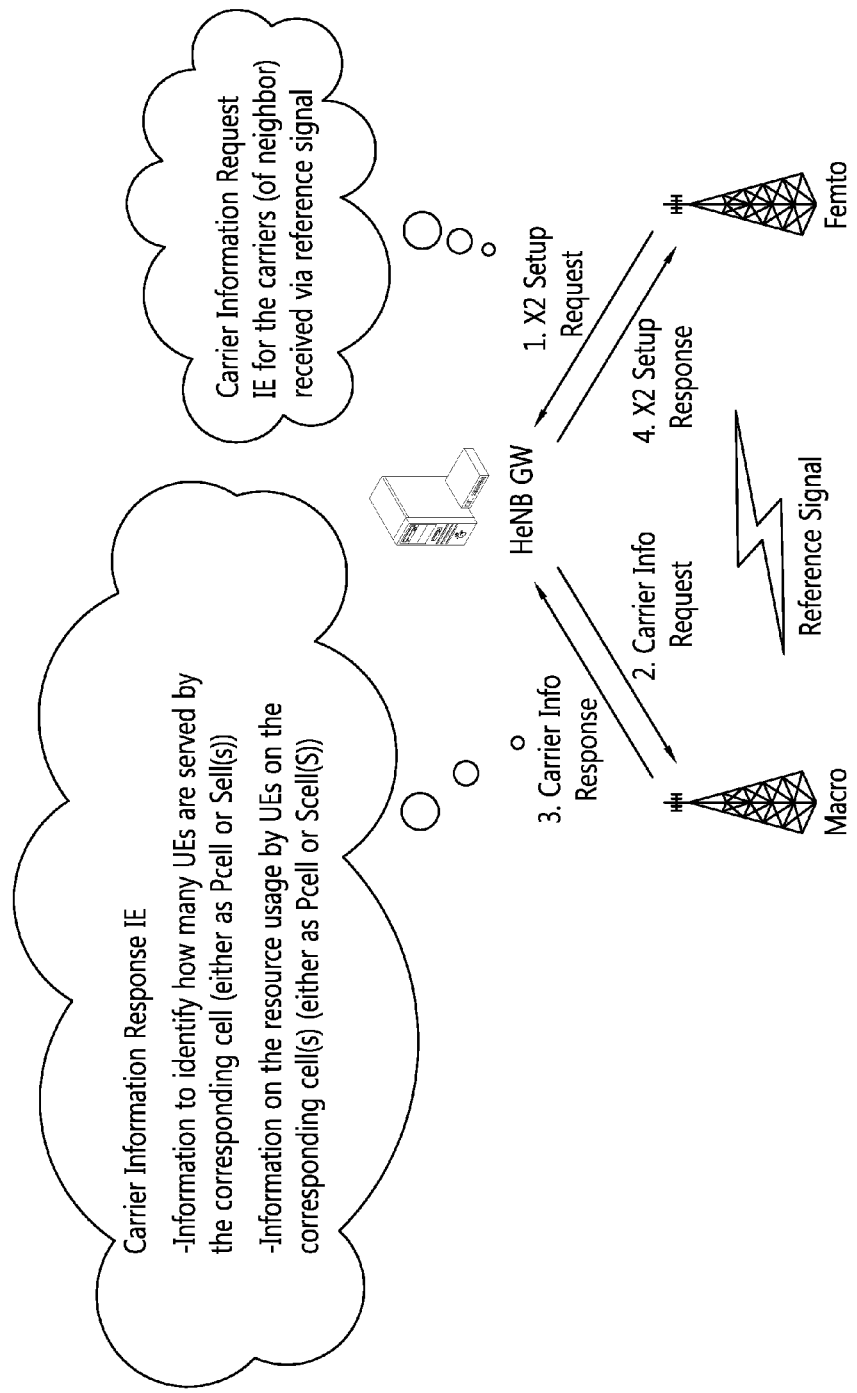
FIG. 9 shows another example of proposed method of selecting a cell in a HetNet according to an embodiment of the present invention.

FIG. 9 shows another example of proposed method of selecting a cell in a HetNet according to an embodiment of the present invention. This case is for the scenario where the pico eNB and the HeNB cannot setup the direct X2 interface between them.

Referring to FIG. 9, the newly deployed HeNB obtains the information required for PCell/SCell(s) selection via the X2 setup procedure between the HeNB and the HeNB GW with the aid of the HeNB GW. Here, the HeNB is ready to first select the PCell/SCell(s).

1. The HeNB transmits an X2 setup request message to the HeNB GW. The X2 setup request message may request the information on carriers used by the neighbor macro eNB by triggering the X2 setup procedure. The X2 setup request message may include carrier information request IE to obtain the information for carriers used by the neighbor macro eNB received through the reference signal. The carrier information request IE may be added for the total number of carriers detected by the HeNB. Each carrier information request IE may include following information:

Cell ID related information: physical cell ID (PCI), E-UTRAN cell global ID (ECGI), etc
Other possible cell related information to identify the carriers received through the reference signal from the neighbor macro eNB 2. The HeNB GW transmits a carrier information request message to the neighbor macro eNB. The carrier information request message may include the carrier information request IE included in the X2 setup request message.

3. The neighbor macro eNB transmits a carrier information response message to the HeNB GW as a response of the carrier information request message. The carrier information response message may include carrier information response IE for the PCell/SCell(s). The carrier information response IE may include information to identify how many UEs are served by the corresponding cell (either as PCell or SCell(s)). The carrier information response IE may include information on the resource usage by UEs on the corresponding cell (either as PCell or SCell(s)). The carrier information response indication IE may be added for the total number of carriers. Each carrier information response indication IE may include following information:

- Cell ID related information: PCI, ECGI, etc
- Information to identify the type of cells: PCell indication information, SCell indication information
- Other possible cell related information to identify the property of corresponding cells received through the reference signal from the neighbor macro eNB
- UE ratio indication IE: the number of UEs using this cell as a PCell (PCell indication information, {primary high density, primary medium density, primary low density})
- UE ratio indication IE: the number of UEs using this cell as a SCell9s) (PCell indication information, {secondary high density, secondary medium density, secondary low density})
- resource usage status IE: resource usage status of corresponding carrier by UEs (Pcell indication information or SCell(s) indication information, {high use, medium use, low use})—The resource usage status may be calculated for the DL/UL/total PRB as defined in X2 interface.

4. The HeNB GW transmits an X2 setup response message to the HeNB as a response of the X2 setup request message. The X2 setup response message may include the carrier information response IE included in the carrier information response message.

When the HeNB receives the X2 setup response message from the HeNB GW, the HeNB may flexibly select its PCell/SCell(s) based on the received information for mitigating the interference between itself and the neighbor macro eNB. As an example, the HeNB may simply select the PCell or SCell(s) that is not affected from the interference from the cell(s) of the neighbor macro eNB. This may be inferred from other information contained in the X2 setup procedure, i.e., frequency and bandwidth. Also, there may be several possible cases to use the combination of information explained above. For example, if the UE ratio indication IE indicates high density, the HeNB may avoid configuring its cell using the same carrier frequency with that of the macro eNB (indicated as PCell) as its PCell. Although the UE ratio indication IE indicates medium density or even low density, if the resource usage status IE (or the radio resource status IE) indicates high density, then the HeNB may avoid configuring its cell using the same carrier frequency with that of the macro eNB (indicated as PCell) as its PCell. The same principle may be applied to the selection of SCell(s) by the pico eNB.

In this way, the uncoordinated deployment of HeNB will benefit from having the support of flexible PCell/SCell(s) selection method.

Figure 10:
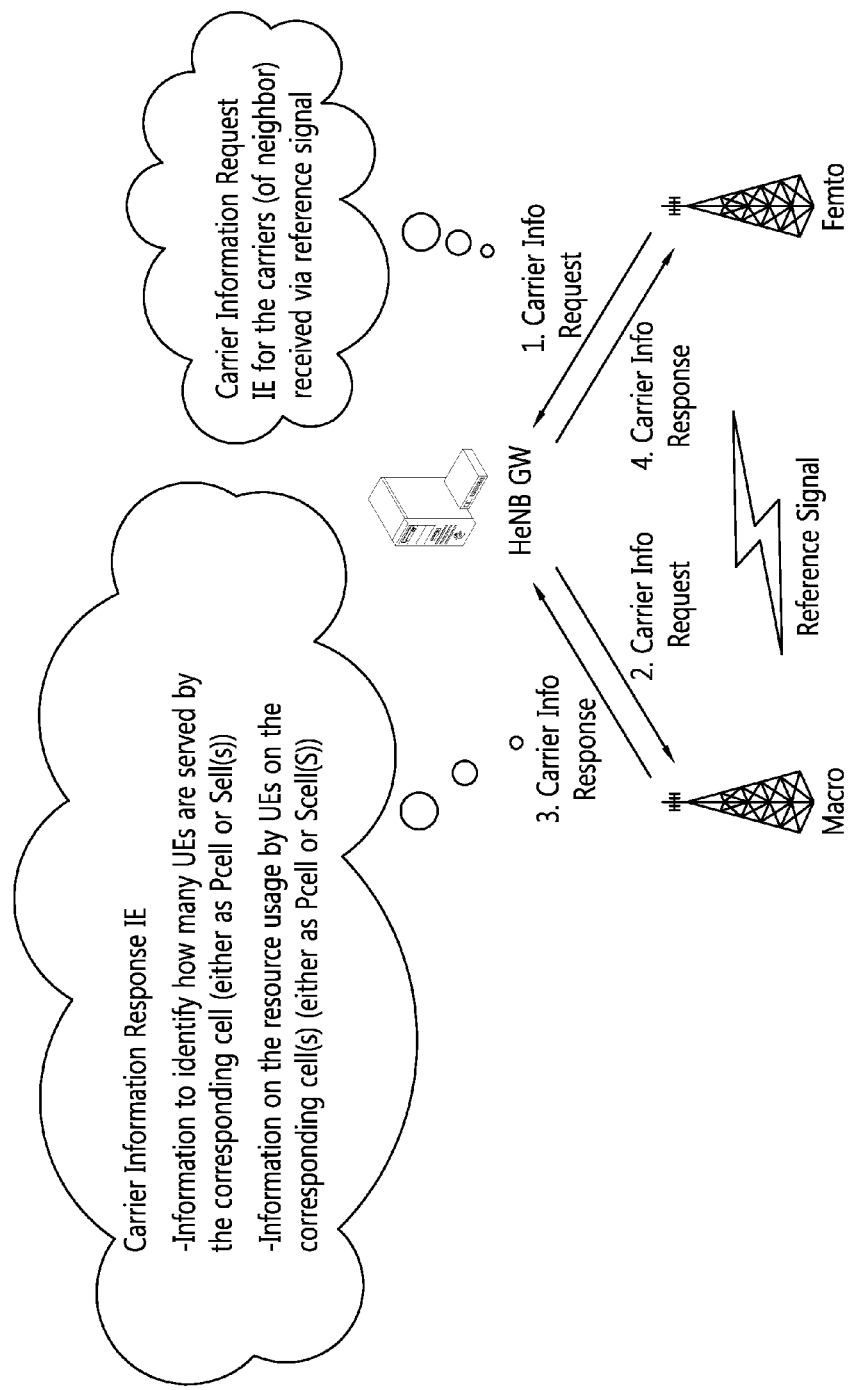
FIG. 10 shows another example of proposed method of selecting a cell in a HetNet according to an embodiment of the present invention.

FIG. 10 shows another example of proposed method of selecting a cell in a HetNet according to an embodiment of the present invention. This case is also for the scenario where the macro eNB and the HeNB cannot setup the direct X2 interface between them. This example may be performed after the indirect X2 interface is setup between the HeNB and the HeNB GW.

Referring to FIG. 10, the newly deployed HeNB obtains the information required for PCell/SCells(s) selection via a carrier information procedure between the HeNB and the macro eNB with the aid of the HeNB GW. Here, the HeNB is ready to select the PCell/SCell(s).

1. The HeNB transmits a carrier information request message to the HeNB GW. The carrier information request message may request the information on carriers used by the neighbor macro eNB by triggering the carrier information procedure. The carrier information request message may include carrier information request IE to obtain the information for carriers used by the neighbor macro eNB received through the reference signal. The carrier information request IE may be added for the total number of carriers detected by the HeNB. Each carrier information request IE may include following information:

- Cell ID related information: physical cell ID (PCI), E-UTRAN cell global ID (ECGI), etc
- Other possible cell related information to identify the carriers received through the reference signal from the neighbor macro eNB 2. The HeNB GW forwards the carrier information request message to the neighbor macro eNB.

3. The neighbor macro eNB transmits a carrier information response message to the HeNB GW as a response of the carrier information request message. The carrier information response message may include carrier information response IE for the PCell/SCell(s). The carrier information response IE may include information to identify how many UEs are served by the corresponding cell (either as PCell or SCell(s)). The carrier information response IE may include information on the resource usage by UEs on the corresponding cell (either as PCell or SCell(s)). The carrier information response indication IE may be added for the total number of carriers. Each carrier information response indication IE may include following information:

- Cell ID related information: PCI, ECGI, etc
- Information to identify the type of cells: PCell indication information, SCell indication information
- Other possible cell related information to identify the property of corresponding cells received through the reference signal from the neighbor macro eNB
- UE ratio indication IE: the number of UEs using this cell as a PCell (PCell indication information, {primary high density, primary medium density, primary low density})
- UE ratio indication IE: the number of UEs using this cell as a SCell9s) (PCell indication information, {secondary high density, secondary medium density, secondary low density})
- resource usage status IE: resource usage status of corresponding carrier by UEs (Pcell indication information or SCell(s) indication information, {high use, medium use, low use})—The resource usage status may be calculated for the DL/UL/total PRB as defined in X2 interface.

4. The HeNB GW forwards the carrier information response message to the HeNB as a response of the X2 setup request message.

When the HeNB receives the carrier information response message from the HeNB GW, the HeNB may flexibly select its PCell/SCell(s) based on the received information for mitigating the interference between itself and the neighbor macro eNB. As an example, the HeNB may simply select the PCell or SCell(s) that is not affected from the interference from the cell(s) of the neighbor macro eNB. This may be inferred from other information contained in the X2 setup procedure, i.e., frequency and bandwidth. Also, there may be several possible cases to use the combination of information explained above. For example, if the UE ratio indication IE indicates high density, the HeNB may avoid configuring its cell using the same carrier frequency with that of the macro eNB (indicated as PCell) as its PCell. Although the UE ratio indication IE indicates medium density or even low density, if the resource usage status IE (or the radio resource status IE) indicates high density, then the HeNB may avoid configuring its cell using the same carrier frequency with that of the macro eNB (indicated as PCell) as its PCell. The same principle may be applied to the selection of SCell(s) by the pico eNB.

In this way, the uncoordinated deployment of HeNB will benefit from having the support of flexible PCell/SCell(s) selection method.

The carrier information request/response messages mentioned above are the simple examples of messages exchanged between the macro eNB and the HeNB to achieve the interference mitigation between them. That is, the carrier information request/response indications described in the above examples may be substituted with the existing X2 messages, e.g., resource status request/response/update message, load information message, etc.

Figure 11:
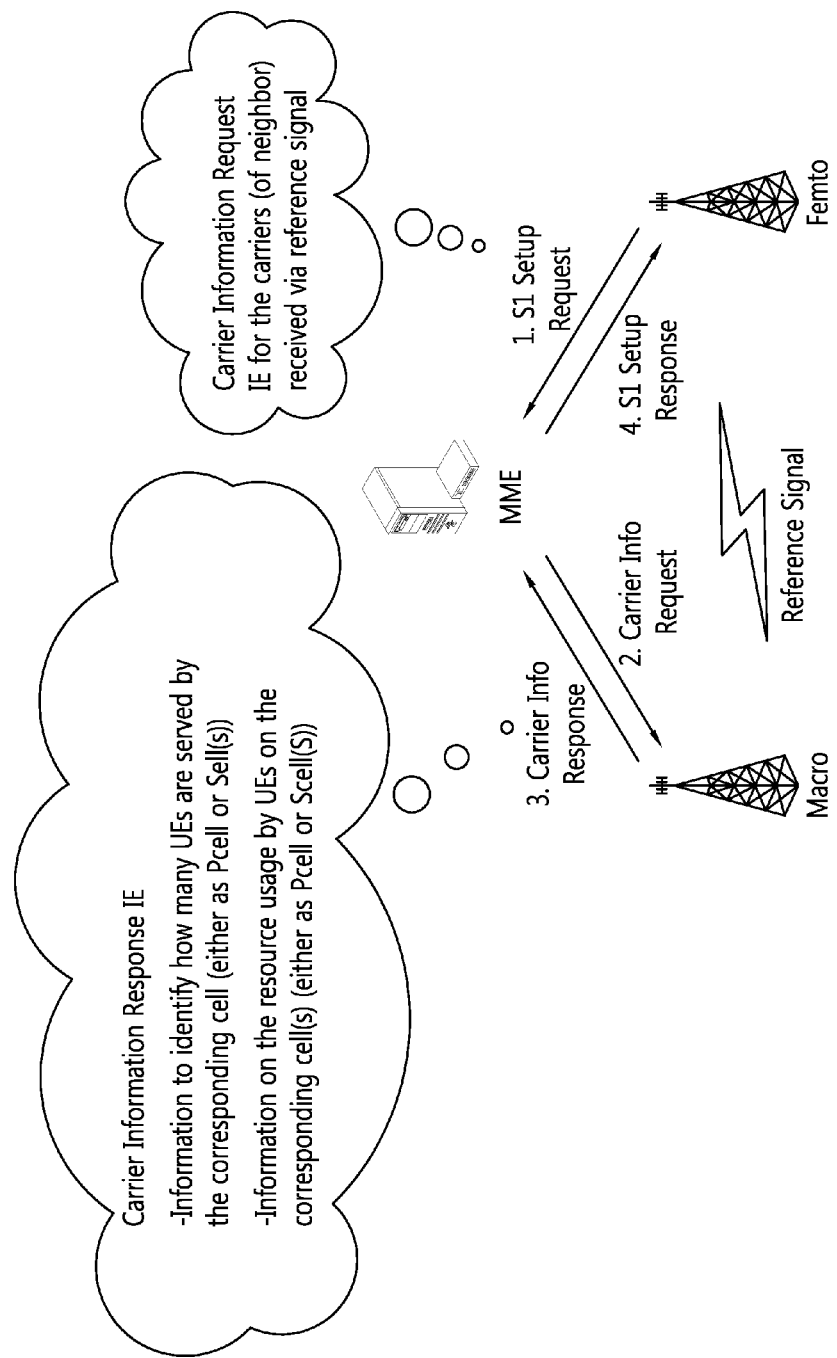
FIG. 11 shows another example of proposed method of selecting a cell in a HetNet according to an embodiment of the present invention.

FIG. 11 shows another example of proposed method of selecting a cell in a HetNet according to an embodiment of the present invention. This case is also for the scenario where the macro eNB and the HeNB cannot setup the direct X2 interface between them.

Referring to FIG. 11, the newly deployed HeNB obtains the information required for PCell/SCell(s) selection via the S1 setup procedure between the HeNB and the MME with the aid of the MME. Here, the HeNB is ready to first select the PCell/SCell(s).

1. The HeNB transmits an S1 setup request message to the MME. The S1 setup request message may request the information on carriers used by the neighbor macro eNB by triggering the S1 setup procedure. The S1 setup request message may include carrier information request IE to obtain the information for carriers used by the neighbor macro eNB received through the reference signal. The carrier information request IE may be added for the total number of carriers detected by the HeNB. Each carrier information request IE may include following information:
   Cell ID related information: physical cell ID (PCI), E-UTRAN cell global ID (ECGI), etc
   Other possible cell related information to identify the carriers received through the reference signal from the neighbor macro eNB 2. The MME transmits a carrier information request message to the neighbor macro eNB. The carrier information request message may include the carrier information request IE included in the S1 setup request message.

3. The neighbor macro eNB transmits a carrier information response message to the MME as a response of the carrier information request message. The carrier information response message may include carrier information response IE for the PCell/SCell(s). The carrier information response IE may include information to identify how many UEs are served by the corresponding cell (either as PCell or SCell(s)). The carrier information response IE may include information on the resource usage by UEs on the corresponding cell (either as PCell or SCell(s)). The carrier information response indication IE may be added for the total number of carriers. Each carrier information response indication IE may include following information:
   Cell ID related information: PCI, ECGI, etc
   Information to identify the type of cells: PCell indication information, SCell indication information
   Other possible cell related information to identify the property of corresponding cells received through the reference signal from the neighbor macro eNB
   UE ratio indication IE: the number of UEs using this cell as a PCell (PCell indication information, {primary high density, primary medium density, primary low density})
   UE ratio indication IE: the number of UEs using this cell as a SCell9s) (PCell indication information, {secondary high density, secondary medium density, secondary low density})
   resource usage status IE: resource usage status of corresponding carrier by UEs (Pcell indication information or SCell(s) indication information, {high use, medium use, low use})—The resource usage status may be calculated for the DL/UL/total PRB as defined in X2 interface.

4. The MME transmits an S1 setup response message to the HeNB as a response of the S1 setup request message. The S1 setup response message may include the carrier information response IE included in the carrier information response message.

When the HeNB receives the S1 setup response message from the MME, the HeNB may flexibly select its PCell/SCell(s) based on the received information for mitigating the interference between itself and the neighbor macro eNB. As an example, the HeNB may simply select the PCell or SCell(s) that is not affected from the interference from the cell(s) of the neighbor macro eNB. This may be inferred from other information contained in the X2 setup procedure, i.e., frequency and bandwidth. Also, there may be several possible cases to use the combination of information explained above. For example, if the UE ratio indication IE indicates high density, the HeNB may avoid configuring its cell using the same carrier frequency with that of the macro eNB (indicated as PCell) as its PCell. Although the UE ratio indication IE indicates medium density or even low density, if the resource usage status IE (or the radio resource status IE) indicates high density, then the HeNB may avoid configuring its cell using the same carrier frequency with that of the macro eNB (indicated as PCell) as its PCell. The same principle may be applied to the selection of SCell(s) by the pico eNB.

In this way, the uncoordinated deployment of HeNB will benefit from having the support of flexible PCell/SCell(s) selection method.

Figure 12:
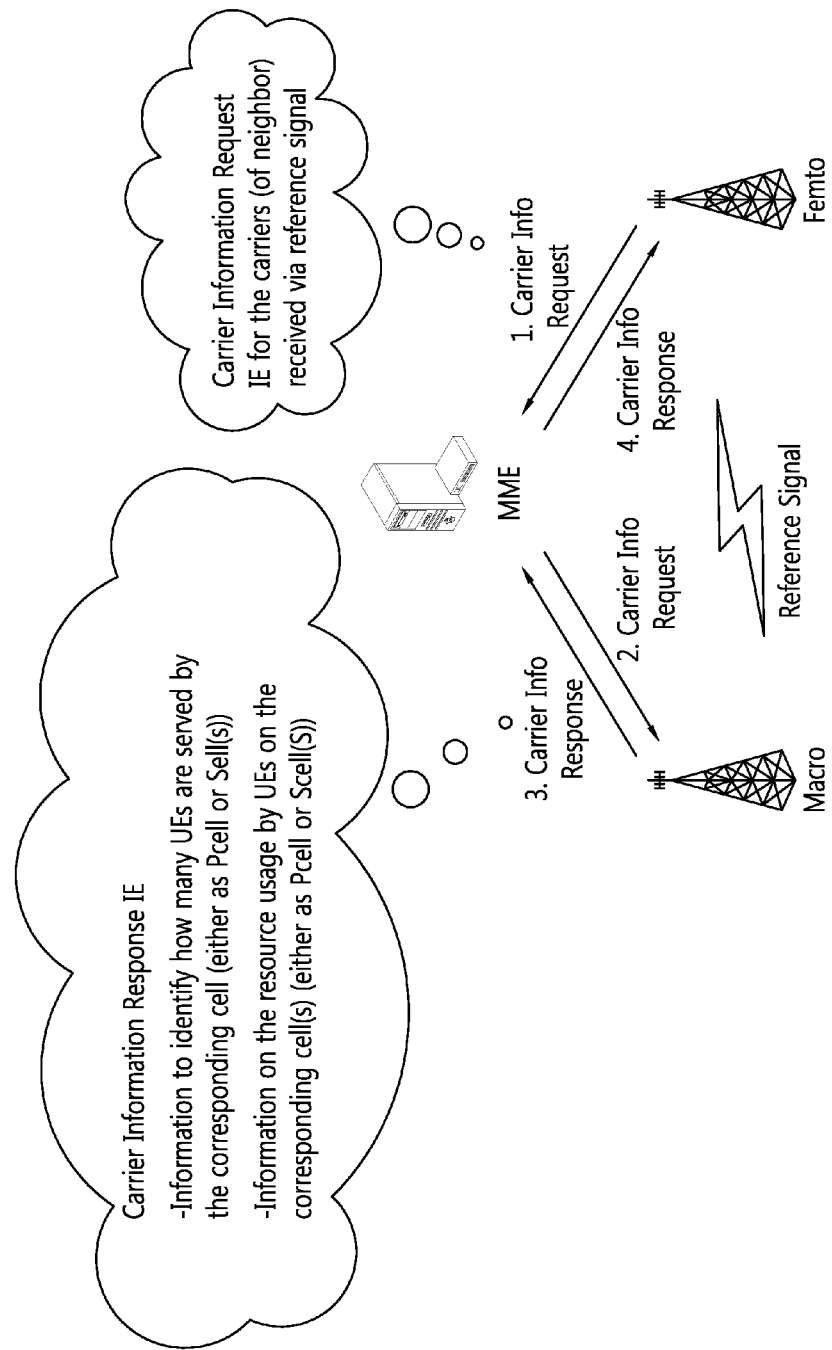
FIG. 12 shows another example of proposed method of selecting a cell in a HetNet according to an embodiment of the present invention.

FIG. 12 shows another example of proposed method of selecting a cell in a HetNet according to an embodiment of the present invention. This case is also for the scenario where the macro eNB and the HeNB cannot setup the direct X2 interface between them. This example may be performed after the S1 interface is setup between the HeNB and the MME.

Referring to FIG. 12, the HeNB obtains the information required for PCell/SCell(s) selection via a carrier information procedure between the HeNB and the macro eNB with the aid of the MME. Here, the HeNB is ready to select the PCell/SCell(s).

1. The HeNB transmits a carrier information request message to the MME. The carrier information request message may request the information on carriers used by the neighbor macro eNB by triggering the carrier information procedure. The carrier information request message may include carrier information request IE to obtain the information for carriers used by the neighbor macro eNB received through the reference signal. The carrier information request IE may be added for the total number of carriers detected by the HeNB. Each carrier information request IE may include following information:
   Cell ID related information: physical cell ID (PCI), E-UTRAN cell global ID (ECGI), etc
   Other possible cell related information to identify the carriers received through the reference signal from the neighbor macro eNB 2. The MME forwards the carrier information request message to the neighbor macro eNB.

3. The neighbor macro eNB transmits a carrier information response message to the MME as a response of the carrier information request message. The carrier information response message may include carrier information response IE for the PCell/SCell(s). The carrier information response IE may include information to identify how many UEs are served by the corresponding cell (either as PCell or SCell(s)). The carrier information response IE may include information on the resource usage by UEs on the corresponding cell (either as PCell or SCell(s)). The carrier information response indication IE may be added for the total number of carriers. Each carrier information response indication IE may include following information:

Cell ID related information: PCI, ECGI, etc
    Information to identify the type of cells: PCell indication information, SCell indication information
    Other possible cell related information to identify the property of corresponding cells received through the reference signal from the neighbor macro eNB
    UE ratio indication IE: the number of UEs using this cell as a PCell (PCell indication information, {primary high density, primary medium density, primary low density})
    UE ratio indication IE: the number of UEs using this cell as a SCell9s) (PCell indication information, {secondary high density, secondary medium density, secondary low density})
    resource usage status IE: resource usage status of corresponding carrier by UEs (Pcell indication information or SCell(s) indication information, {high use, medium use, low use})—The resource usage status may be calculated for the DL/UL/total PRB as defined in X2 interface.

4. The MME forwards the carrier information response message to the HeNB as a response of the X2 setup request message.

When the HeNB receives the carrier information response message from the MME, the HeNB may flexibly select its PCell/SCell(s) based on the received information for mitigating the interference between itself and the neighbor macro eNB. As an example, the HeNB may simply select the PCell or SCell(s) that is not affected from the interference from the cell(s) of the neighbor macro eNB. This may be inferred from other information contained in the X2 setup procedure, i.e., frequency and bandwidth. Also, there may be several possible cases to use the combination of information explained above. For example, if the UE ratio indication IE indicates high density, the HeNB may avoid configuring its cell using the same carrier frequency with that of the macro eNB (indicated as PCell) as its PCell. Although the UE ratio indication IE indicates medium density or even low density, if the resource usage status IE (or the radio resource status IE) indicates high density, then the HeNB may avoid configuring its cell using the same carrier frequency with that of the macro eNB (indicated as PCell) as its PCell. The same principle may be applied to the selection of SCell(s) by the pico eNB.

In this way, the uncoordinated deployment of HeNB will benefit from having the support of flexible PCell/SCell(s) selection method.

The carrier information request/response messages mentioned above are the simple examples of messages exchanged between the macro eNB and the HeNB to achieve the interference mitigation between them. That is, the carrier information request/response indications described in the above examples may be substituted with the existing X2 messages, e.g., resource status request/response/update message, load information message, etc.

Figure 13:
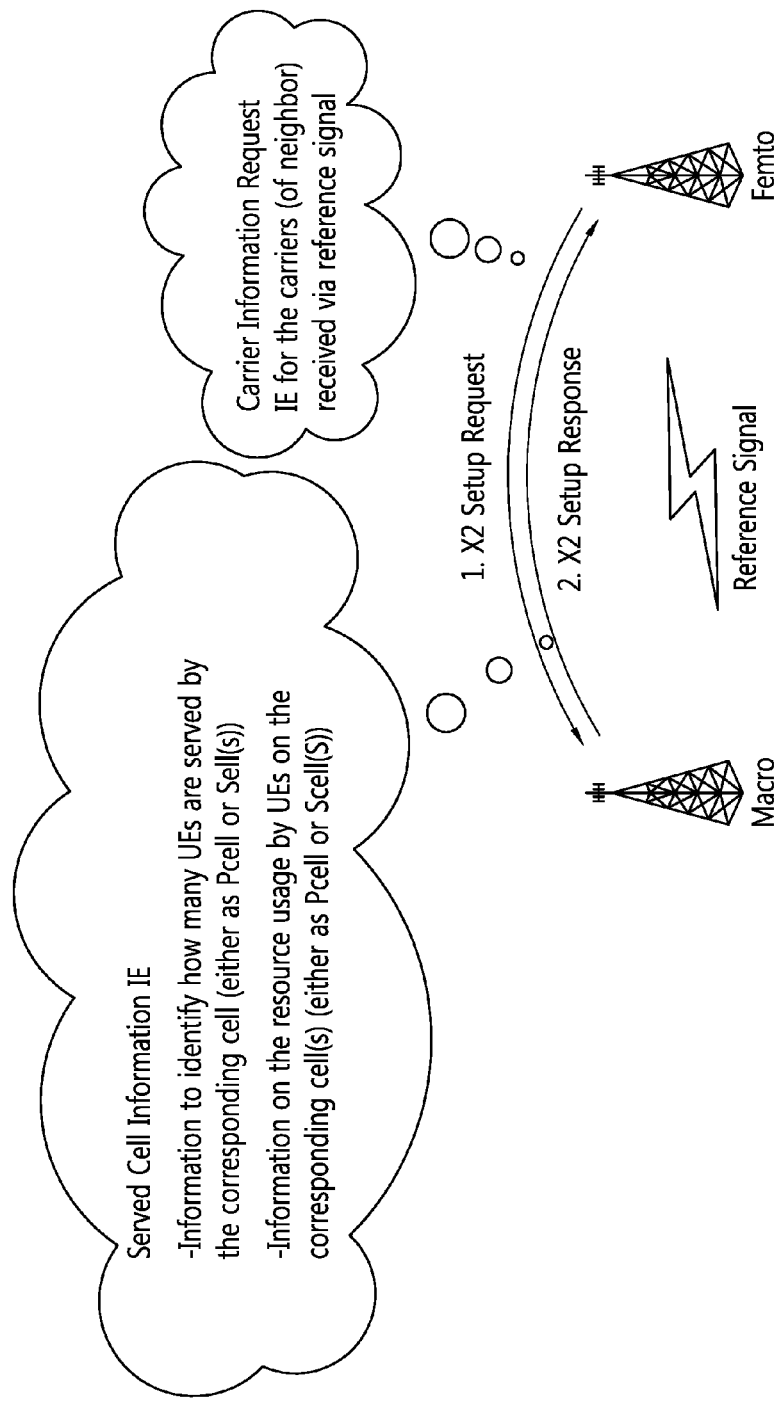
FIG. 13 shows another example of proposed method of selecting a cell in a HetNet according to an embodiment of the present invention.

FIG. 13 shows another example of proposed method of selecting a cell in a HetNet according to an embodiment of the present invention. This case is for the scenario where the macro eNB and the HeNB can setup the direct X2 interface between them.

Referring to FIG. 13, the newly deployed HeNB obtains the information required for PCell/SCell(s) selection via the X2 setup procedure directly between the HeNB and the macro eNB. Here, the HeNB is ready to first select the PCell/SCell(s).

1. The HeNB transmits an X2 setup request message to the neighbor macro eNB. The X2 setup request message may request the information on carriers used by the neighbor macro eNB by triggering the X2 setup procedure. The X2 setup request message may include carrier information request IE to obtain the information for carriers used by the neighbor macro eNB received through the reference signal. The carrier information request IE may be added for the total number of carriers detected by the HeNB. Each carrier information request IE may include following information:

Cell ID related information: physical cell ID (PCI), E-UTRAN cell global ID (ECGI), etc
    Other possible cell related information to identify the carriers received through the reference signal from the neighbor macro eNB 2. The neighbor macro eNB transmits an X2 setup response message to the HeNB as a response of the X2 setup request message. The X2 setup response message may include carrier information response IE for the PCell/SCell(s). The carrier information response IE may include information to identify how many UEs are served by the corresponding cell (either as PCell or SCell(s)). The carrier information response IE may include information on the resource usage by UEs on the corresponding cell (either as PCell or SCell(s)). The carrier information response indication IE may be added for the total number of carriers. Each carrier information response indication IE may include following information:

Cell ID related information: PCI, ECGI, etc
    Information to identify the type of cells: PCell indication information, SCell indication information
    Other possible cell related information to identify the property of corresponding cells received through the reference signal from the neighbor macro eNB
    UE ratio indication IE: the number of UEs using this cell as a PCell (PCell indication information, {primary high density, primary medium density, primary low density})
    UE ratio indication IE: the number of UEs using this cell as a SCell9s) (PCell indication information, {secondary high density, secondary medium density, secondary low density})
    resource usage status IE: resource usage status of corresponding carrier by UEs (Pcell indication information or SCell(s) indication information, {high use, medium use, low use})—The resource usage status may be calculated for the DL/UL/total PRB as defined in X2 interface.

Or, the X2 setup response message may be transmitted without receiving any earlier request from the HeNB if the X2 setup procedure is initiated by the macro eNB toward the HeNB.

When the HeNB receives the X2 setup response message from the macro eNB, the HeNB may flexibly select its PCell/SCell(s) based on the received information for mitigating the interference between itself and the neighbor macro eNB. As an example, the HeNB may simply select the PCell or SCell(s) that is not affected from the interference from the cell(s) of the neighbor macro eNB. This may be inferred from other information contained in the X2 setup procedure, i.e., frequency and bandwidth. Also, there may be several possible cases to use the combination of information explained above. For example, if the UE ratio indication IE indicates high density, the HeNB may avoid configuring its cell using the same carrier frequency with that of the macro eNB (indicated as PCell) as its PCell. Although the UE ratio indication IE indicates medium density or even low density, if the resource usage status IE (or the radio resource status IE) indicates high density, then the HeNB may avoid configuring its cell using the same carrier frequency with that of the macro eNB (indicated as PCell) as its PCell. The same principle may be applied to the selection of SCell(s) by the pico eNB.

In this way, the uncoordinated deployment of HeNB will benefit from having the support of flexible PCell/SCell(s) selection method.

Figure 14:
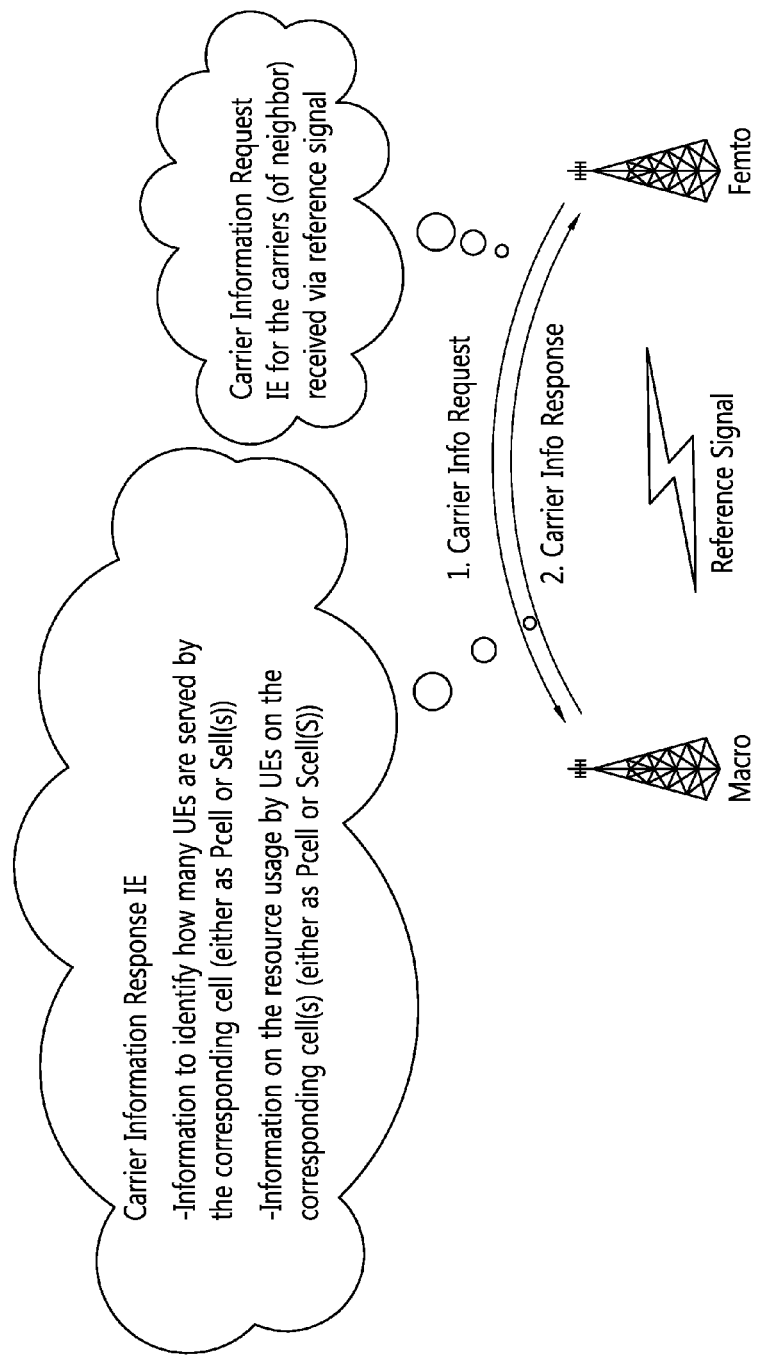
FIG. 14 shows another example of proposed method of selecting a cell in a HetNet according to an embodiment of the present invention.

FIG. 14 shows another example of proposed method of selecting a cell in a HetNet according to an embodiment of the present invention. This case is also for the scenario where the macro eNB and the HeNB can setup the direct X2 interface between them. This example may be performed after the direct X2 interface is setup between the HeNB and the macro eNB.

Referring to FIG. 14, the HeNB obtains the information required for PCell/SCell(s) selection via the carrier information procedure directly between the HeNB and the macro eNB. Here, the HeNB is ready to select the PCell/SCell(s).

1. The HeNB transmits a carrier information request message to the neighbor macro eNB. The carrier information request message may request the information on carriers used by the neighbor macro eNB by triggering the carrier information procedure. The carrier information request message may include carrier information request IE to obtain the information for carriers used by the neighbor macro eNB received through the reference signal. The carrier information request IE may be added for the total number of carriers detected by the HeNB. Each carrier information request IE may include following information:

Cell ID related information: physical cell ID (PCI), E-UTRAN cell global ID (ECGI), etc Other possible cell related information to identify the carriers received through the reference signal from the neighbor macro eNB 2. The neighbor macro eNB transmits a carrier information response message to the HeNB as a response of the carrier information request message. The carrier information response message may include carrier information response IE for the PCell/SCell(s). The carrier information response IE may include information to identify how many UEs are served by the corresponding cell (either as PCell or SCell(s)). The carrier information response IE may include information on the resource usage by UEs on the corresponding cell (either as PCell or SCell(s)). The carrier information response indication IE may be added for the total number of carriers. Each carrier information response indication IE may include following information:

Cell ID related information: PCI, ECGI, etc

Information to identify the type of cells: PCell indication information, SCell indication information Other possible cell related information to identify the property of corresponding cells received through the reference signal from the neighbor macro eNB UE ratio indication IE: the number of UEs using this cell as a PCell (PCell indication information, {primary high density, primary medium density, primary low density})

UE ratio indication IE: the number of UEs using this cell as a SCell9s) (PCell indication information, {secondary high density, secondary medium density, secondary low density})

resource usage status IE: resource usage status of corresponding carrier by UEs (Pcell indication information or SCell(s) indication information, {high use, medium use, low use})—The resource usage status may be calculated for the DL/UL/total PRB as defined in X2 interface.

When the HeNB receives the carrier information response message from the macro eNB, the HeNB may flexibly select its PCell/SCell(s) based on the received information for mitigating the interference between itself and the neighbor macro eNB. As an example, the HeNB may simply select the PCell or SCell(s) that is not affected from the interference from the cell(s) of the neighbor macro eNB. This may be inferred from other information contained in the X2 setup procedure, i.e., frequency and bandwidth. Also, there may be several possible cases to use the combination of information explained above. For example, if the UE ratio indication IE indicates high density, the HeNB may avoid configuring its cell using the same carrier frequency with that of the macro eNB (indicated as PCell) as its PCell. Although the UE ratio indication IE indicates medium density or even low density, if the resource usage status IE (or the radio resource status IE) indicates high density, then the HeNB may avoid configuring its cell using the same carrier frequency with that of the macro eNB (indicated as PCell) as its PCell. The same principle may be applied to the selection of SCell(s) by the pico eNB.

In this way, the uncoordinated deployment of HeNB will benefit from having the support of flexible PCell/SCell(s) selection method.

The carrier information request/response messages mentioned above are the simple examples of messages exchanged between the pico eNB and the HeNB to achieve the interference mitigation between them. That is, the carrier information request/response indications described in the above examples may be substituted with the existing X2 messages, e.g., resource status request/response/update message, load information message, etc.

Meanwhile, a method of PCell selection using frequency ranking information may be proposed. If a pico eNB (or HeNB) is interfered by the neighbor macro eNB (or pico eNB, HeNB), it shall continue operation by selecting another carrier from the available carriers allowed to be used. Obviously, the newly selected carrier should be the one that is not or less interfered by the neighbor macro eNB (or pico eNB, HeNB). That is, the newly selected carrier is assigned for PCell. Hence, some enhancements are needed for the method of PCell selection by the pico eNB (or HeNB) in HetNet environment. A method of automatic PCell selection for carrier resolution which can avoid or reduce the interference between the pico eNB (or HeNB) and the neighbor macro eNB (or pico eNB, HeNB) may be proposed.

Basically, the eNB (macro eNB, pico eNB, HeNB) may keep tracing information about which cell(s) is(are) configured for UEs as PCell(s). Also, the eNB (macro eNB, pico eNB, HeNB) may keep tracing the ranking about carrier frequency information regarding its own PCell configuration. For example, it is assumed that the eNB (macro eNB, pico eNB, HeNB) uses the carriers 1, 2, 3. Further, it is assumed that for 90 UEs, the eNB configures PCell by using carrier 1 and for 40 UEs, the eNB configures PCell by using carrier 2. Finally, it is assumed that the carrier 3 is not configured as PCell by the eNB. The example of such ranking information tracked by the eNB can be shown in table 1 below. Especially for carrier 3, the eNB can separately keep tracing the carrier(s) not configured for PCell by itself.

TABLE 1

| Frequency Ranking | Carrier Information | |
|---|---|---|
| 1 | Carrier 3 | No PCell Configuration |
| 2 | Carrier 2 | |
| 3 | Carrier 1 | |

Figure 15:
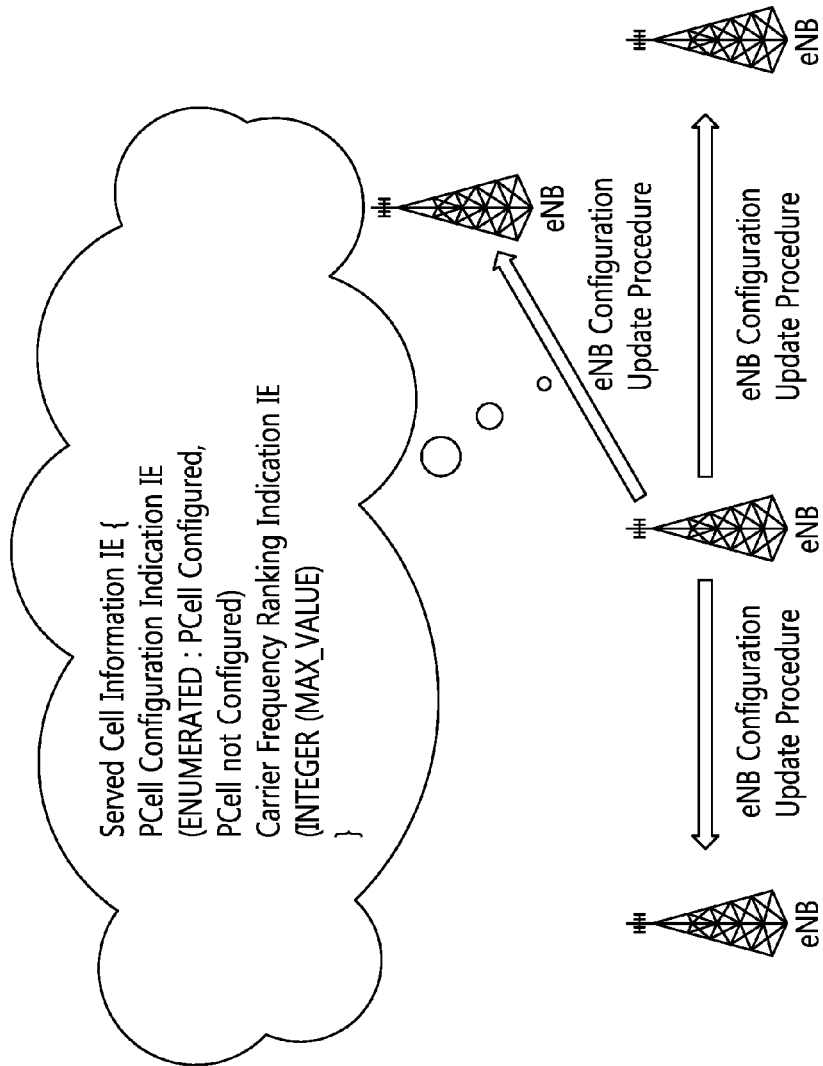
FIG. 15 shows an example of proposed method of configuring a PCell in a HetNet according to an embodiment of the present invention.

FIG. 15 shows an example of proposed method of configuring a PCell in a HetNet according to an embodiment of the present invention.

When the eNB (macro eNB, pico eNB, HeNB) changes its PCell configuration by using other carriers allowed to be used, the eNB (macro eNB, pico eNB, HeNB) transmits a PCell configuration indication information and carrier frequency ranking information regarding its own PCell configuration toward the neighboring eNB(s) (pico eNB(s), HeNB(s)) via the X2 interface. The information may be transmitted by using the eNB configuration update message. The eNB configuration update message may include the served cell information IE. The served cell information IE ma include PCell related information to identify the property of corresponding cells. The served cell information IE may include following information:

PCell Configuration Indication IE: specify whether the cell is configured as PCell or not
ENUMERATED {PCell configured, PCell not configured}
Carrier frequency ranking indication IE: specify the ranking of carriers configured as PCell based on the number of UEs. The carrier with higher number of UEs can get the lower ranking than the carrier with smaller number of UEs.
INTEGER {MAX_VALUE}

When the eNB (macro eNB, pico eNB, HeNB) receives the eNB configuration update message, the eNB may flexibly configure its PCell based on the received information for mitigating the interference between itself and the eNB transmitting the eNB configuration update message. As an example, the pico eNB may simply select the PCell that is not affected from the interference from the cell(s) of the eNB originating the eNB configuration update message. This may be inferred from the information on PCell configuration indication. Alternatively, the pico eNB may simply select the PCell that can reduce the interference from the cell(s) of the eNB originating the eNB configuration update message. This may be inferred from the information on carrier frequency ranking indication. The same principle may be applied to the selection of SCell(s) by the eNB (pico eNB, HeNB).

In this way, the eNB (pico eNB, HeNB) will benefit from having the support of flexible PCell selection method. If the eNB is HeNB<the enhanced eNB configuration update procedure can be applied with (or without) the aid of the HeNB GW.

Figure 16:
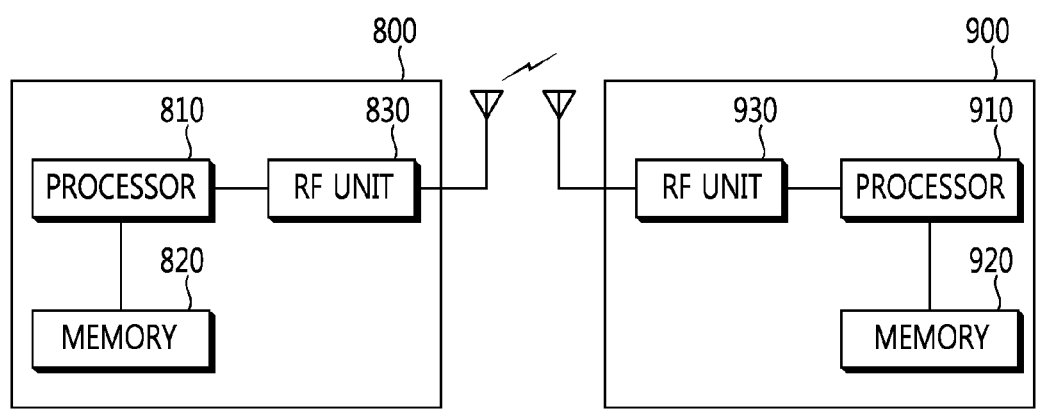
FIG. 16 is a block diagram showing wireless communication system to implement an embodiment of the present invention.

FIG. 16 is a block diagram showing wireless communication system to implement an embodiment of the present invention.

A first eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for selecting, by a pico eNodeB (eNB), a cell in a wireless communication system, the method comprising:
receiving a served cell information for a primary cell (PCell) or a secondary cell (SCell) from a neighbor eNB, wherein the served cell information is configured by the neighbor eNB, and
wherein the served cell information includes information on a number or portion of user equipments (UEs) served by a corresponding cell and information on a resource usage status of the corresponding cell by the UEs; and
selecting the PCell or the Scell based on the received served cell information,
wherein the resource usage status of the corresponding cell by the UEs is calculated for a downlink (DL) physical resource block (PRB), an uplink (UL) PRB, and a total PRB as defined in an X2 interface.

2. The method of claim 1, wherein the served cell information is included in an X2 setup request message or an X2 setup response message.

3. The method of claim 1, wherein the neighbor eNB is one of a macro eNB, a pico eNB and a home eNB (HeNB).

4. The method of claim 3, wherein if the neighbor eNB is the HeNB, the served cell information is received through a HeNB gateway (GW) from the HeNB.

5. A method for selecting a cell in a wireless communication system, the method performed by a macro eNodeB (eNB) adjacent to a pico eNB and comprising:
 receiving an eNB configuration update message including a served cell information for a primary cell (PCell) or a secondary cell (SCell) from the pico eNB,
 wherein the served cell information is configured by the macro eNB, and
 wherein the served cell information includes information on a number or portion of user equipments (UEs) served by a corresponding cell and information on a resource usage status of the corresponding cell by the UEs; and
 selecting the PCell or the SCell based on the received served cell information,
 wherein the resource usage status of the corresponding cell by the UEs is calculated for a downlink (DL) physical resource block (PRB), an uplink (UL) PRB, and a total PRB as defined in an X2 interface.

6. The method of claim 5, wherein the served cell information further includes information on a PCell configuration indication and a carrier frequency ranking indication.

7. The method of claim 6, wherein the PCell configuration indication specifies whether a cell is configured as a PCell or not.

8. The method of claim 6, wherein the carrier frequency ranking indication specifies a ranking of carriers based on the number of UEs, in which UE is served by the corresponding carrier as a PCell.

9. A method for selecting, by a home eNodeB (HeNB), a cell in a wireless communication system, the method comprising:
 transmitting a carrier information request message including a request of information on carriers used by a neighbor eNB;
 receiving a carrier information response message as a response of the carrier information request message,
 wherein the carrier information response message includes a served cell information for a primary cell (PCell) or a secondary cell (SCell) from a pico eNB,
 wherein the served cell information is configured by the neighbor eNB, and
 wherein the served cell information includes information on a number or portion of user equipments (UEs) served by a corresponding cell and information on a resource usage status of the corresponding cell by the UEs; and
 selecting the PCell or the SCell based on the received served cell information,
 wherein the resource usage status of the corresponding cell by the UEs is calculated for a downlink (DL) physical resource block (PRB), an uplink (UL) PRB, and a total PRB as defined in an X2 interface.

10. The method of claim 9, wherein the neighbor eNB is one of a macro eNB, a pico eNB and a home eNB (HeNB).

11. The method of claim 10, wherein if the neighbor eNB is the HeNB, the served cell information is received through a HeNB gateway (GW) from the HeNB.

12. The method of claim 9, wherein the carrier information request message is included in an X2 setup request message, and
 the carrier information response message is included in an X2 setup response message.

* * * * *